United States Patent [19]
Miyahara

[11] Patent Number: 5,264,468
[45] Date of Patent: Nov. 23, 1993

[54] AQUEOUS CROSSLINKABLE RESIN COMPOSITION

[75] Inventor: Toru Miyahara, Hirakata, Japan

[73] Assignee: Chuo Rika Kogyo Corporation, Hirakata, Japan

[21] Appl. No.: 725,705

[22] Filed: Jul. 3, 1991

[30] Foreign Application Priority Data

Jul. 4, 1990 [JP] Japan .................................. 2-178045

[51] Int. Cl.$^5$ .......................... C08K 3/20; C08L 63/02
[52] U.S. Cl. ..................................... 523/400; 523/412
[58] Field of Search .............................. 523/412, 400

[56] References Cited

U.S. PATENT DOCUMENTS 4,339,368  7/1982  Tsou et al. ........................ 523/416
4,882,372  11/1989  Woo et al. ........................ 523/411

Primary Examiner—Melvyn I. Marquis
Assistant Examiner—D. Aylward
Attorney, Agent, or Firm—Joseph C. Mason, Jr.; Ronald E. Smith

[57] ABSTRACT

An aqueous crosslinkable resin composition suitable as surface coating material, under coating material, impregnation treating material or binder and having excellent properties such as solvent resistance, water resistance, thermal discoloration resistance, long pot life and no generation of formaldehyde, which comprises (A) an acrylic copolymer of a carboxyl group-containing monomer, an alkyl acrylate or methacrylate, and optionally a monomer having a basic nitrogen atom and/or other copolymerizable vinyl monomers, wherein at least 0.5 % by mole of carboxyl groups is neutralized with an imidazole compound, and (B) an epoxy resin, the equivalent ratio of the carboxyl group of (A) to the epoxy group of (B) being from ⅓ to 3/1.

4 Claims, No Drawings

AQUEOUS CROSSLINKABLE RESIN COMPOSITION

BACKGROUND OF THE INVENTION

The present invention relates to an aqueous crosslinkable resin composition, and more particularly to an aqueous crosslinkable resin composition which is suitable as surface coating materials or under coating materials for papers, woods, metals, plastics or inorganic materials, and as impregnation processing materials or binders for papers, fibers and the like.

Conventionally, surface coating materials and under coating materials have been required to be aqueous system from the viewpoint of danger of fire or safety and sanitation in working, and to be non-formalin system which does not generate formaldehyde from the viewpoint of safety and sanitation of processed products. In consideration of the safety and sanitation, epoxy resins or acrylic resins have been generally employed as the surface coating material and the like.

The epoxy resins themselves have excellent properties such as water resistance, chemical resistance and adhesiveness to substrates or materials, but they do not always exhibit sufficiently these properties in an aqueous system such as an aqueous solution or an aqueous dispersion.

The acrylic resins are inferior to thermosetting resins such as melamine resin, epoxy resin, polyurethane resin in properties such as solvent resistance and water resistance. In order to improve these properties, it has been attempted to modify the acrylic resins, for example, by introducing a reactive group such as carboxyl group, methylol group, amido group, amino group or epoxy group into the acrylic resins, so reacting the reactive group with each other or with other compounds, e.g. melamine resin, epoxy resin, isocyanate compound or aziridine compound. However, such modified acrylic resins are still insufficient in solvent resistance and water resistance.

It is an object of the present invention to provide an aqueous crosslinkable resin composition which is suitable as surface coating material, under coating material, impregnation treating material or binder and which has no danger of producing formaldehyde and has excellent properties such as solvent resistance, water resistance, thermal discoloration resistance, chemical resistance and adhesiveness to substrates.

A further object of the present invention is to provide an aqueous resin composition having a good curability and a long pot life.

These and other objects of the present invention will become apparent from the description hereinafter.

SUMMARY OF THE INVENTION

In accordance with the present invention, there is provided an aqueous crosslinkable resin composition which comprises:

(A) an acrylic copolymer of 5 to 50% by weight of a monomer containing carboxyl group, 50 to 95% by weight of an alkyl ester of acrylic or methacrylic acid and 0 to 30% by weight of other vinyl monomer copolymerizable therewith, in which at least 0.5% by mole of the carboxyl group is neutralized with an imidazole compound, and (B) an epoxy resin, the equivalent ratio of the carboxyl group of the acrylic copolymer (A) to the epoxy group of the epoxy resin (B) being from 1:3 to 3:1.

The acrylic copolymer (A) may further contain 2 to 35% by weight of a monomer having a basic nitrogen atom, whereby the crosslinking reaction between the acrylic copolymer (A) and the epoxy resin (B) is further accelerated.

DETAILED DESCRIPTION

The monomer containing carboxyl group is used in order to impart a water-solubility or water-dispersibility and a crosslinkability with epoxy group of the epoxy resin to the obtained acrylic copolymer. Typical examples of the carboxyl group-containing monomer are, for instance, unsaturated carboxylic acids, particularly $\alpha,\beta$-unsaturated carboxylic acids, such as maleic acid, fumaric acid, crotonic acid, acrylic acid, methacrylic acid, itaconic acid, and the like. Among them, acrylic acid and methacrylic acid are particularly preferred because of good copolymerizability. These monomers may be used alone or in admixture thereof.

The amount of the carboxyl group-containing monomer is from 5 to 50% by weight, preferably 10 to 40% by weight, based on the whole monomers used in the production of the acrylic copolymer. When the amount of the carboxyl group-containing monomer is less than 5% by weight, the water-dispersibility and the crosslinkability are not sufficient. When the amount is more than 50% by weight, the water-solubility of the produced copolymer is large, but the cured product formed by crosslinking reaction between the acrylic copolymer and the epoxy resin is poor in water resistance and alkali resistance.

The alkyl ester of acrylic or methacrylic acid is employed in order to give a flexibility or a rigidity to the obtained acrylic copolymer (A). The alkyl ester of acrylic or methacrylic acid includes, for instance, alkyl methacrylates having a $C_1$ to $C_8$ alkyl group, and alkyl acrylates having a $C_1$ to $C_8$ alkyl group. The alkyl acrylates or methacrylates may be used alone or in admixture thereof.

Typical examples of the alkyl methacrylates are, for instance, methyl methacrylate, ethyl methacylate, n-butyl methacrylate, t-butyl methacrylate, isobutyl methacrylate, 2-ethylhexyl methacrylate, and the like. Typical examples of the alkyl acrylates are, for instance, methyl acrylate, ethyl acrylate, n-butyl acrylate, isobutyl acrylate, 2-ethylhexyl acrylate, octyl acrylate, and the like. Particularly, methyl methacrylate, methyl acrylate, ethyl acrylate and butyl acrylate are preferably used because of superior solvent resistance.

The amount of the alkyl acrylate or methacrylate is from 50 to 95% by weight, preferably 60 to 90% by weight, based on the whole monomers used. When the amount of the acrylate and/or methacrylate is less than 50% by weight, the amount of the carboxyl group-containing monomer becomes relatively excessive, on the other hand, when the amount is more than 95% by weight, the amount of the carboxyl group-containing monomer becomes relatively less. In any case, it is difficult to provide both a good solvent resistance and a good water resistance.

In order to improve the crosslinking reactivity between the acrylic copolymer and the epoxy resin, a monomer having a basic nitrogen atom may be used in the preparation of the acrylic copolymer. Aminoalkyl acrylates and methacrylates are preferably used as the N-containing monomer. Typical examples of the N-containing monomer are, for instance, N,N-dimethylaminoethyl acrylate, N,N-diethylaminoethyl acrylate, N,N-dimethylaminopropyl acrylate, N,N-dimethylaminoethyl methacrylate, N,N-diethylaminoethyl methacrylate, N,N-dimethylaminopropyl methacrylate, and the like. The N-containing monomer may be used alone or in admixture thereof. The amount of the N-containing monomer is from 2 to 35% by weight, preferably 5 to 30% by weight, based on the whole monomers used. When the amount of the monomer is less than 2% by weight, a crosslinking reactivity of the obtained acrylic copolymer with epoxy resin is not increased. When the amount of the N-containing monomer is more than 35% by weight, the amount becomes too large relative to the amount of the carboxyl group-containing monomer because the total amount of the N-containing monomer and the carboxyl group-containing monomer should be controlled not more than 50% by weight of the total weight of the whole monomers used as stated after. As a result, use of an excess amount of ammonia, an organic amine or other basic compounds is required to neutralize the obtained acrylic copolymer so as to make soluble or dispersible in water, thus the pot life of the obtained resin composition tends to decrease to one hour or less because the pH of the system increases to more than 9.

If the total amount of the N-containing monomer and the carboxyl group-containing monomer exceeds 50% by weight of the whole monomers constituting the acrylic copolymer, the water resistance of the obtained resin composition tends to decrease. Therefore, it is desirable that the total amount of these monomers is not more than 50% by weight, preferably not more than 40% by weight.

In the present invention, other copolymerizable vinyl monomers may be employed as a component of the acrylic copolymer together with the carboxyl group-containing monomer, the (meth)acrylate and optionally the N-containing monomer, for the purpose of improving the crosslinkability between the acrylic copolymer (A) and the epoxy resin (B), the compatibility with pigments or the adhesive property. Typical examples of the other copolymerizable vinyl monomer are, for instance, (meth)acrylonitrile, (meth)acrylamide, N-methylol (meth)acrylamide, 2-hydroxyethyl (meth)acrylate, glycidyl (meth)acrylate, methoxyethyl (meth)acrylate, butoxyethyl (meth)acrylate, styrene, vinyl acetate, vinyl propionate, vinyl versatate, and the like. The amount of the other copolymerizable vinyl monomer is from 0 to 30% by weight of the total of the whole monomers used. When the amount is more than 30% by weight, the resin composition tends to impair the balance between the solvent resistance and the water resistance.

The acrylic copolymer used in the present invention can be prepared by a known polymerization method such as solution polymerization or emulsion polymerization.

In the case of the solution polymerization method, it is preferable to conduct the polymerization in a water-miscible organic solvent in view of the subsequent step for imparting a water solubility or water dispersibility to the produced copolymer. Typical examples of the water-miscible organic solvent are, for instance, an alcohol such as methyl alcohol, ethyl alcohol, isopropyl alcohol or butyl alcohol; a ketone such as methyl ethyl ketone; an ether such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monobutyl ether; and the like.

In the case of the emulsion polymerization method, the polymerization is conducted in an aqueous medium. The amount of an emulsifying agent is generally from 0.05 to 10% by weight, preferably 0.1 to 5% by weight, based on the aqueous medium. Examples of the emylsifying agent are, for instance, a cationic surface active agent such as stearylamine hydrochloride salt, lauryltrimethylammonium chloride or trimethyloctadecylammonium chloride; an anionic surface active agent such as potassium oleate, sodium laurylsulfate, sodium dodecylbenzenesulfonate, sodium alkylnaphthalenesulfonate, sodium dialkylsulfosuccinate, sodium polyoxyethylene alkyl ether sulfate, sodium polyoxyethylene alkylaryl ether sulfate, polyoxyethylene alkyl ether phosphate or polyoxyethylene alkylaryl ether phosphate; a non-ionic surface active agent such as polyoxyethylene alkyl ether, polyoxyethylene alkylaryl ether, poly(oxyethylene-oxypropylene) block copolymer, polyethylene glycol fatty acid ester or polyoxyethylene sorbitan fatty acid ester; and an amphotelic surface active agent such as lauryl betaine or lauryldimethylamine oxide.

In both the solution polymerization and the emulsion polymerization, the monomer concentration is generally from 30 to 70% by weight, preferably 35 to 65% by weight.

As the initiator to be used in the polymerizaqtion, usual radical initiators can be used. Typical examples of the radical initiator are, for instance, a persulfate such as ammonium persulfate or potassium persulfate; an azo initiator such as 2,2'-azobisisobutyronitrile or 2,2'-azobis(2,4-dimethylvaleronitrile); a peroxide initiator such as benzoyl peroxide or lauroyl peroxide. The amount of the radical initiator is usually from 0.2 to 10% by weight, preferably 0.3 to 5% by weight, based on the total weight of the whole monomers used in the polymerization.

In general, the polymerization is carried out at a temperature of 60° to 100° C. for 2 to 16 hours.

The thus obtained acrylic copolymer is neutralized with a basic compound so that at least 0.5% by mole of the carboxyl groups is neutralized with an imidazole compound.

The imidazole compound serves to accelerate the crosslinking reaction between the carboxyl group of the acrylic copolymer and the epoxy group of the epoxy resin. Excellent curing reactivity and the resin-characteristics which cannot be obtained by a resin composition composed of a conventional acrylic resin and an epoxy resin, are exhibited by the use of the imidazole compound.

The degree of neutralization with the imidazole compound is selected from 0.5 to 90% by mole. From the viewpoints of water resistance and solvent resistance, it is preferable that the degree of neutralization is from 0.5 to 50% by mole, especially from 0.5 to 10% by mole.

Typical examples of the imidazole compound are, for instance, 2-ethyl-4-methyl imidazole, 1-benzyl-4-methyl imidazole, 1-cyanoethyl-2-ethyl-4-methyl imidazole, 1-cyanoethyl-2-isopropyl imidazole, 2-methyl imidazole, 2-ethyl imidazole, imidazole, and the like.

The neutralization of carboxyl groups of the acrylic copolymer is also conducted in order to provide a water solubility or a water dispersibility to the acrylic copolymer. It is preferable to neutralize not less than 20% by mole, preferably not less than 30% by mole, of the carboxyl groups. When the degree of neutralization is in excess, the pot life of the compound obtained by mixing with the epoxy resin is decreased because the pH rises too high. Therefore, it is desirable that the degree of the neutralization is usually at most 90% by mole.

In addition to the imidazole compound, other basic compounds may be used in the present invention in order to impart a water solubility or dispersibility. Examples of the other basic compounds are, for instance, ammonia; an alkylamine such as monomethylamine, dimethylamine, trimethylamine, monoethylamine, diethylamine or triethylamine; an alkanolamine such as monoethanolamine, diethanolamine, triethanolamine or dimethylaminoethanol, diethylaminoethanol; morpholine; pyridine; piperazine; and the like. Ammonia and volatile amines such as monomethylamine or dimethylamine are particularly preferred. These basic compounds may be used alone or in admixture thereof.

It is desirable that the neutralized acrylic copolymer is prepared into an aqueous dispersion or an aqueous solution by adding water before the acrylic copolymer is mixed with the epoxy resin. Usually the neutralization is carried out by adding a basic compound to the polymerization reaction mixture and then adding water to form an aqueous dispersion or solution having an appropriate concentration of the acrylic copolymer. It is desirable to adjust the concentration of acrylic copolymer in the aqueous dispersion or solution to 20 to 60% by weight, preferably 30 to 50% by weight.

Known epoxy resins can be used as the epoxy resin component (B) of the composition according to the present invention. Typical examples of the epoxy resin are, for instance, bisphenol A diglycidyl ether, bisphenol F diglycidyl ether, polypropylene glycol diglycidyl ether, neopentyl glycol diglycidyl ether, phthalic acid diglycidyl ether, dimer acid diglycidyl ether, triglycidyl isocyanurate, tetraglycidylaminodiphenylmethane, cresol novolak polyglycidyl ether, tetrabromobisphenol A diglycidyl ether, ethylene glycol or polyethylene glycol diglycidyl ether, propylene glycol or polypropylene glycol diglycidyl ether, butanediol diglycidyl ether, trimethylolpropane polyglycidyl ether, sorbitol polyglycidyl ether, glycerol polyglycidyl ether, polyglycerol polyglycidyl ether, pentaerythritol polyglycidyl ether, resorcine diglycidyl ether, 1,6-hexanediol diglycidyl ether, and the like. These epoxy resins may be used alone or in admixture thereof. Epoxy resins having a water dispersibility or a water solubility can be used directly. Epoxy resins having no water solubility or dispersibility may be formed into an emulsion, for instance, using a protective colloid or an emulsifier.

The aqueous resin composition of the present invention is prepared usually by adding the epoxy resin or an aqueous emulsion thereof to an aqueous dispersion or solution of the acrylic copolymer. It is the most preferable that the acrylic copolymer (A) and the epoxy resin (B) are admixed in such amounts that the equivalent ratio of the carboxyl group of the acrylic copolymer to the epoxy group of the epoxy resin is approximately 1:1. Usually they can be used within the range that equivalent ratio of carboxyl group to epoxy group is from 1:3 to 3:1. When the equivalent ratio is more than 3/1, the crosslinking does not occur sufficiently, thus resulting in decrease of solvent resistance and water resistance. When the ratio is less than ⅓, excessive epoxy resin remains unreacted, so the solvent resistance and water resistance tend to decrease in a like manner.

The aqueous resin composition of the present invention may contain usual additives, e.g. colorant, filler, dispersing agent, wetting agent, defoamer, fungicide and coalescing agent.

The aqueous resin composition of the present invention is curable and has a long pot life. The crosslinking reaction of the acrylic copolymer and the epoxy resin proceeds by removal of water. The drying of the aqueous composition applied may be carried out spontaneously or compulsorily. The conditions of drying vary depending on the purposes of the aqueous composition. Generally, the drying is conducted at a temperature of from room temperature to 300° C. for several tens of seconds to several days, especially at a temperature of 70° to 250° C. for several tens of seconds to several hours.

The aqueous composition of the present invention has the advantages such as high safety and sanitation, excellent solvent and water resistances, thermal discoloration resistance, chemical resistance, adhesiveness to various materials and long pot life, and can be used for various purposes, for example, as a surface coating material or a under coating material for various materials such as papers, woods, metals and plastics, or as an impregnation treating material or a binder for papers and fibers.

The present invention is more specifically described and explained by means of the following Examples, in which all parts and % are by weight unless otherwise noted. It is to be understood that the present invention is not limited to the Examples.

Examples 1 to 7 and Comparative Examples 1 to 2

A flask equipped with a stirrer, a reflux condenser and an inlet port for introducing raw materials was charged with 210 g of isopropyl alcohol, and kept at 80° C. After adding 1.5 g of 2,2'-azobisisobutyronitrile to the flask, there was added dropwise a mixture of 300 g of monomers shown in Table 1 and 6 g of laurylmercaptan over 3 hours. After the completion of the addition, 0.5 g of 2,2'-azobisisobutyronitrile was added three times every one hour in order to decrease the residual monomers at 80° C. for 3 hours in total.

The obtained copolymer solution was cooled to 40° C., and 2-ethyl-4-methylimidazole was added thereto in an amount shown in Table 1 with stirring. Further, 400 g of water was added gradually with stirring, and the solution was neutralized to about pH 7 with 25% aqueous ammonia as a neutralizing agent to give a transparent resin solution.

The thus prepared resin solution was adjusted with water to a nonvolatile content of 30%. To 100 parts of the diluted resin solution was added the epoxy resin shown in Table 1 to give an aqueous crosslinkable resin composition.

The obtained resin composition was coated with a bar coater on the printed surface of a thin paper in an amount of 6 g/m$^2$ on dry basis, dried at 160° C. for 20 seconds in a hot air circulation dryer, and then aged for 16 hours by allowing to stand in an atmosphere of 20° C. or 40° C. to give test specimens.

The test specimens were then subjected to measurement of blocking resistance, solvent resistance and water resistance according to the following procedures.

The results are shown in Table 2.

(1) Blocking resistance

Immediately after drying, test specimens were kept under a load of 5 kg/cm² at 60° C. for 24 hours. Thereafter the blocking resistance was estimated according to the following criteria.

(Estimation)

◯: No blocking occurs.
X: Blocking occurs.

(2) Solvent resistance

The coated surface of test specimen was rubbed fifty times with a paper-towel impregnated with methyl ethyl ketone (MEK) or methanol. The surface state of the test specimen was observed and estimated according to the following criteria.

(Estimation)

⊙: No change.
◯: Occurrence of pine-hole in the coated layer.
Δ: Abrasion in a part of the coated layer.
X: Abrasion in the entire of the coated layer.

(3) Water resistance

Test specimens prepared by aging at 40° C. for 16 hours were used in this test. Waterdrops were placed on the coated surface, covered with a watch glass and allowed to stand for 24 hours. The surface state of the specimen was visually observed with respect to whitening and blistering and estimated according to the following criteria.

(Estimation)

⊙: No change
◯: A little whitening
Δ: Slightly whitening
X: Marked whitening

TABLE 1

|  | Composition of monomers (g) | | | | | | Imidazole compound (g) | Epoxy resin (part) | Equivalent ratio of carboxyl group to epoxy group |
|---|---|---|---|---|---|---|---|---|---|
|  | MMA | BMA | AA | MAA | DMMA | 2EHA |  |  |  |
| Ex. 1 | 180 | 60 | 60 | — | — | — | EMI 4 | PEPGE 20 | 0.96 |
| Ex. 2 | 165 | 60 | 60 | — | 15 | — | EMI 2 | PEPGE 20 | 0.96 |
| Ex. 3 | 225 | — | — | 75 | — | — | EMI 4 | PEPGE 20 | 1.01 |
| Ex. 4 | 180 | — | — | 120 | — | — | EMI 8 | PEPGE 20 | 1.61 |
| Ex. 5 | 165 | 60 | 60 | — | 15 | — | EMI 2 | EGDGE 10 | 0.93 |
| Ex. 6 | 165 | 60 | 60 | — | 15 | — | EMI 2 | SPGE 16 | 0.94 |
| Ex. 7 | 150 | — | 60 | — | 30 | 60 | EMI 2 | SPGE 10 | 1.50 |
| Com. Ex. 1 | 180 | 60 | 60 | — | — | — | — | PEPGE 20 | 0.96 |
| Com. Ex. 2 | 165 | 60 | 60 | — | 15 | — | — | PEPGE 20 | 0.96 |

| | Physical properties of resin composition | | | | |
|---|---|---|---|---|---|
| | Degree of neutralization of carboxyl group with imidazole compound (% by mole) | Degree of neutralization of the whole carboxyl groups (% by mole) | Non-volatile content (%) | Viscosity (cP) | Pot life (30° C.) |
| Ex. 1 | 4.4 | 75 | 41 | 160 | over 5 hours |
| Ex. 2 | 2.2 | 70 | 41 | 260 | over 5 hours |
| Ex. 3 | 4.2 | 75 | 41 | 590 | over 5 hours |
| Ex. 4 | 5.2 | 75 | 41 | 420 | over 5 hours |
| Ex. 5 | 2.2 | 70 | 36 | 180 | over 5 hours |
| Ex. 6 | 2.2 | 70 | 39 | 460 | over 5 hours |
| Ex. 7 | 2.2 | 70 | 36 | 380 | over 5 hours |
| Com. Ex. 1 | 0 | 75 | 41 | 180 | over 5 hours |
| Com. Ex. 2 | 0 | 70 | 41 | 230 | over 5 hours |

(Note)
MMA: Methyl methacrylate.
BMA: Butyl methacrylate.
AA: Acrylic acid.
MAA: Methacrylic acid.
DMMA: Dimethylaminoethyl methacrylate.
EMI: 2-Ethyl-4-methylimidazole.
PEPGE: Pentaerythrytol polyglycidyl ether.
EGDGE: Ethylene glycol diglycidyl ether.
SPGE: Sorbitol polyglycidyl ether.
2EHA: 2-Ethylhexyl acrylate

TABLE 2

| | Physical properties of coating film | | | | | |
|---|---|---|---|---|---|---|
| | | Solvent resistance | | | | |
| | | Specimen aged at 40° C. for 16 hours | | Specimen aged at 20° C. for 16 hours | | |
| | Blocking resistance | MEK | Methanol | MEK | Methanol | Water resistance |
| Ex. 1 | ◯ | ◯ | ⊙ | ◯ | ◯ | ⊙ |
| Ex. 2 | ◯ | ⊙ | ⊙ | ◯ | ⊙ | ⊙ |
| Ex. 3 | ◯ | ⊙ | ⊙ | ◯ | ◯ | ⊙ |
| Ex. 4 | ◯ | ◯ | ◯ | ◯ | ◯ | ◯ |
| Ex. 5 | ◯ | ⊙ | ⊙ | ◯ | ◯ | ⊙ |
| Ex. 6 | ◯ | ⊙ | ⊙ | ◯ | ⊙ | ⊙ |
| Ex. 7 | ◯ | ⊙ | ⊙ | ◯ | ⊙ | ◯ |
| Com. Ex. 1 | ◯ | X | X~Δ | X | X | Δ |
| Com. Ex. 2 | ◯ | Δ | Δ | X~Δ | Δ | Δ |

Example 8

A flask equipped with a stirrer, a reflux condenser and an inlet port for introducing raw materials was charged with 375 g of water and 0.5 g of sodium lauryl sulfate as an emulsifier, and kept at 80° C. After adding 1.5 g of ammonium persulfate, there was added dropwise over 3 hours a monomer emulsion obtained by mixing a mixture of 174 g of methyl methacrylate, 90 g of ethyl acrylate, 36 g of methacrylic acid and 6 g of laurylmercaptane with 0.5 g of sodium lauryl sulfate and 270 g of water.

After the completion of the addition, 0.5 g of ammonium persulfate was added to the flask and the reaction was further continued at 80° C. for 2 hours in order to decrease the residual monomers.

After cooling the obtained emulsion to 75° C., a 10% aqueous solution of 3 g of 2-methylimidazole was added, and the emulsion was further neutralized to about pH 7 with 25% aqueous ammonia as a neutralizing agent to give a translucent aqueous dispersion.

The aqueous dispersion was adjusted to a non-volatile content of 30% by adding water.

To 100 parts of the diluted aqueous dispersion was added 13 parts of an emulsion (non-volatile content 72%, pH 5.5, viscosity 40,000 cP) of a bisphenol A type epoxy resin (commercially available under the trademark "Epikote" 828 from Yuka Shell Epoxy Kabushiki Kaisha) to give an aqueous crosslinkable resin composition.

The obtained resin composition was coated on an anodically surface-treated aluminum plate in a dry film thickness of about 100 μm, pre-dired at 70° C. for 30 minutes in a hot air circulation dryer, and then baked at 160° C. for 10 minutes to give test specimens.

With respect to the obtained test specimens, the solvent resistance and boiling water resistance were measured according to the procedures mentioned below.

The results are shown in Table 3.

(I) Solvent resistance

Test specimens were dipped in acetone. After 3, 5 and 10 minutes, each specimen was taken out and the surface thereof was scratched with nail. Also, the appearance was visually observed. The solvent resistance was estimated based on the presence or absence of scratches and change in appearance according to the following criteria.

(Estimation)

⊙: Not scratched with nail, no change in appearance

○: Slightly scratched with nail, no change in appearance

Δ: Easily scratched with nail, slight swelling of coating film

X: Dissolution or peeling of coating film (II) Boiling water resistance

Test specimens were dipped in boiling water, and observed with respect to occurrence of whitening 1 and 3 minutes after. The boiling water resistance was estimated according to the following criteria.

(Estimation)

○: No whitening
Δ: Slight whitening
X: Marked whitening

Comparative Example 3

The procedure of Example 8 was repeated except that 2-methylimidazole was not employed, to give a resin composition (equivalent ratio of carboxyl group/epoxy group: 0.85).

With respect to the obtained resin composition, the solvent resistance and boiling water resistance were measured in the same manner as in Example 8.

The results are shown in Table 3.

TABLE 3

|  | Solvent resistance (min.) | | | Boiling resistance (min.) | |
| --- | --- | --- | --- | --- | --- |
|  | 3 | 5 | 10 | 1 | 3 |
| Ex. 8 | ⊙ | ⊙ | ○ | ○ | ○ |
| Com. Ex. 3 | Δ~○ | Δ | X | Δ | X |

From the results shown in Tables 2 and 3, it is understood that the films formed from the aqueous crosslinkable resin compositions of the present invention are superior in all of the blocking resistance, solvent resistance and water resistance.

In addition to the ingredients used in the Examples, other ingredients can be used in the Examples as set forth in the specification to obtain substantially the same results.

What is claimed is:

1. An aqueous crosslinkable resin composition which comprises:
    (A) an acrylic copolymer of 5 to 50% by weight of a monomer containing carboxyl group, 50 to 95% by weight of an alkyl ester of acrylic or methacrylic acid and 0 to 30% by weight of other vinyl monomer copolymerizable therewith, in which at least 0.5% by mole of the carboxyl group is neutralized with an imidazole compound, and
    (B) an epoxy resin, the equivalent ratio of the carboxyl group of said acrylic copolymer (A) to the epoxy group of said epoxy resin (B) being from 1:3 to 3:1.

2. The composition of claim 1, wherein the degree of neutralization of said acrylic copolymer (A) is at least 20% by mole.

3. The composition of claim 1, wherein 0.5 to 50% by mole of the carboxyl groups of said acrylic copolymer (A) is neutralized with an imidazole compound.

4. The composition of claim 1, wherein said acrylic copolymer (A) is in the form of an aqueous solution or dispersion containing 20 to 60% by weight of said copolymer (A).

* * * * *